United States Patent
Wei

(10) Patent No.: US 12,437,088 B2
(45) Date of Patent: Oct. 7, 2025

(54) CONTAINER OPERATION CONTROL METHOD AND APPARATUS

(71) Applicant: Beijing Volcano Engine Technology Co., Ltd., Beijing (CN)

(72) Inventor: Wei Wei, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/843,232

(22) PCT Filed: May 29, 2023

(86) PCT No.: PCT/CN2023/096771
§ 371 (c)(1),
(2) Date: Aug. 30, 2024

(87) PCT Pub. No.: WO2024/016838
PCT Pub. Date: Jan. 25, 2024

(65) Prior Publication Data
US 2025/0258940 A1    Aug. 14, 2025

(30) Foreign Application Priority Data

Jul. 21, 2022  (CN) .......................... 202210865142.9

(51) Int. Cl.
*H04L 29/06*  (2006.01)
*G06F 21/60*  (2013.01)

(52) U.S. Cl.
CPC .... *G06F 21/604* (2013.01); *G06F 2221/2141* (2013.01)

(58) Field of Classification Search
CPC .................. G06F 21/604; G06F 2221/2141
See application file for complete search history.

(56) References Cited

U.S. PATENT DOCUMENTS 9,959,415 B1    5/2018  Rodriguez et al.
2017/0116415 A1*  4/2017  Stopel ..................... G06F 21/52
(Continued)

FOREIGN PATENT DOCUMENTS

CN    107643940 A    1/2018
CN    110352428 A    10/2019
(Continued)

OTHER PUBLICATIONS

International Patent Application No. PCT/CN2023/096771; Int'l Written Opinion and Search Report; dated Aug. 16, 2023; 8 pages.
(Continued)

*Primary Examiner* — Vance M Little
(74) *Attorney, Agent, or Firm* — BakerHostetler

(57) ABSTRACT

The embodiments of the present disclosure relate to the technical field of computers. Provided are a container operation control method and apparatus. The method further comprises: providing at least one type of container security protection profile, which can be selected and configured by a user, wherein the at least one type of container security protection profile comprises: a container security protection profile based on a container security baseline and/or for a specified vulnerability in a container environment; receiving a profile configuration request, which is initiated on the basis of the at least one type of container security protection profile, wherein the profile configuration request comprises a profile identifier of a target container security protection profile and object information of a target protection object related to a container, and the profile configuration request is used for requesting to perform security protection on the target protection object on the basis of the target container security protection profile; and in response to the profile configuration request, starting the target container security protection profile for the target protection object, so as to
(Continued)

perform access control on an access request on the basis of the target container security protection profile.

20 Claims, 6 Drawing Sheets

(56) References Cited

U.S. PATENT DOCUMENTS

| | | | | |
|---|---|---|---|---|
| 2018/0046457 | A1* | 2/2018 | Branca | G06F 21/57 |
| 2019/0171811 | A1* | 6/2019 | Daniel | G06F 21/53 |
| 2019/0213319 | A1* | 7/2019 | Gerebe | H04L 63/12 |
| 2019/0342335 | A1 | 11/2019 | Ni et al. | |
| 2020/0285733 | A1* | 9/2020 | Kim | G06F 21/53 |
| 2021/0224093 | A1* | 7/2021 | Fu | G06F 9/5072 |
| 2022/0337417 | A1* | 10/2022 | Sanders | H04L 67/34 |

FOREIGN PATENT DOCUMENTS

| | | |
|---|---|---|
| CN | 112270011 A | 1/2021 |
| CN | 112615856 A | 4/2021 |
| CN | 113220417 A | 8/2021 |
| CN | 113687914 A | 11/2021 |
| CN | 113836557 A | 12/2021 |
| CN | 114172726 A | 3/2022 |
| CN | 114238950 A | 3/2022 |
| CN | 114661419 A | 6/2022 |
| CN | 115185642 A | 10/2022 |
| WO | WO 2018/160504 A1 | 9/2018 |

OTHER PUBLICATIONS

China Patent Application No. 202210865142.9; Office Action; dated Feb. 21, 2024; 18 pages.
China Patent Application No. 202210865142.9; Notice of Registrations; dated Jun. 3, 2024; 8 pages.
Xing et al.; "Container Security Protection Scheme Based on System Call Restriction"; Journal of Wuhan University; vol. 68 No. 1; Feb. 2022; p. 35-43 (contains English Abstract).
"Protect your Kubernetes data plane hardening"; https://learn.microsoft.com/en-us/azure/defender-for-cloud/kubernetes-workload-protections; Microsoft; Aug. 2024; accessed Nov. 26, 2024; 12 pages.
"Runtime security"; https://aws.github.lo/aws-eks-best-practices/security/docs/runtime/; Github; accessed Nov. 26, 2024; 5 pages.
"Securing containers with AppArmor"; https://cloud.google.com/container-optimized-os/docs/how-to/secure-apparmor; Google; Nov. 2024; accessed Nov. 26, 2024; 6 pages.
"Best practices for cluster security and upgrades in Azure Kubernetes Service (AKS)"; https://learn.microsoft.com/en-us/azure/aks/operator-best-practices-cluster-security?tabs=azure-cli#apparmor; Microsoft; Nov. 2024; accessed Nov. 26, 2024; 6 pages.
"Harden workload isolation with GKE Sandbox"; https://cloud.google.com/kubernetes-engine/docs/how-to/sandbox-pods; Google; Nov. 2024; accessed Nov. 26, 2024; 11 pages.
"Security Sandbox Overview"; https://help.aliyun.com/zh/ack/ack-managed-and-ack-dedicated/user-guide/overview-10; Aliyun; Apr. 2024; accessed Nov. 26, 2024; 10 pages.
"Kata-containers / kata-containers"; https://github.com/kata-containers/kata-containers; Github; accessed Nov. 26, 2024; 5 pages.
"Kubernetes-sig / security-profiles-operators"; https://github.com/kubernetes-sigs/security-profiles-operator; Github; accessed Nov. 26, 2024; 6 pages.
"Kubernetes / kubernetes"; https://github.com/kubernetes/kubernetes/tree/c30da3839c8e13fdff59ef5115e982362b2c90ed/test/images/apparmor-loader; Github; accessed Nov. 26, 2024; 3 pages.
"Openshift / machine-config-operator"; https://github.com/openshift/machine-config-operator/tree/master/docs; Github; accessed Nov. 26, 2024; 5 pages.
"Kubearmor / KubeArmor"; https://github.com/kubearmor/KubeArmor; Github; access Nov. 26, 2024; 5 pages.
"Pod Security Standards"; https://kubernetes.io/docs/concepts/security/pod-security-standards/; Jul. 2024; accessed Nov. 26, 2024; 9 pages.
"Kubernetes—This CIS Benchmark is the product of a community consensus process and consists of secure configuration guidelines developed for Kubernetes"; https://www.cisecurity.org/benchmark/kubernetes; CIS; © 2024; accessed Nov. 26, 2024; 5 pages.
https://cloud.google.com/Kubernetes-engine/docs/concepts/securityoverview#limiting_pod_container_process_privileges; Not Found/Expired.
https://sysdig.com/blog/manage-apparmor-profiles-in-kubernetes-with-kube-apparmormanager/; Not Found/Expired.

\* cited by examiner

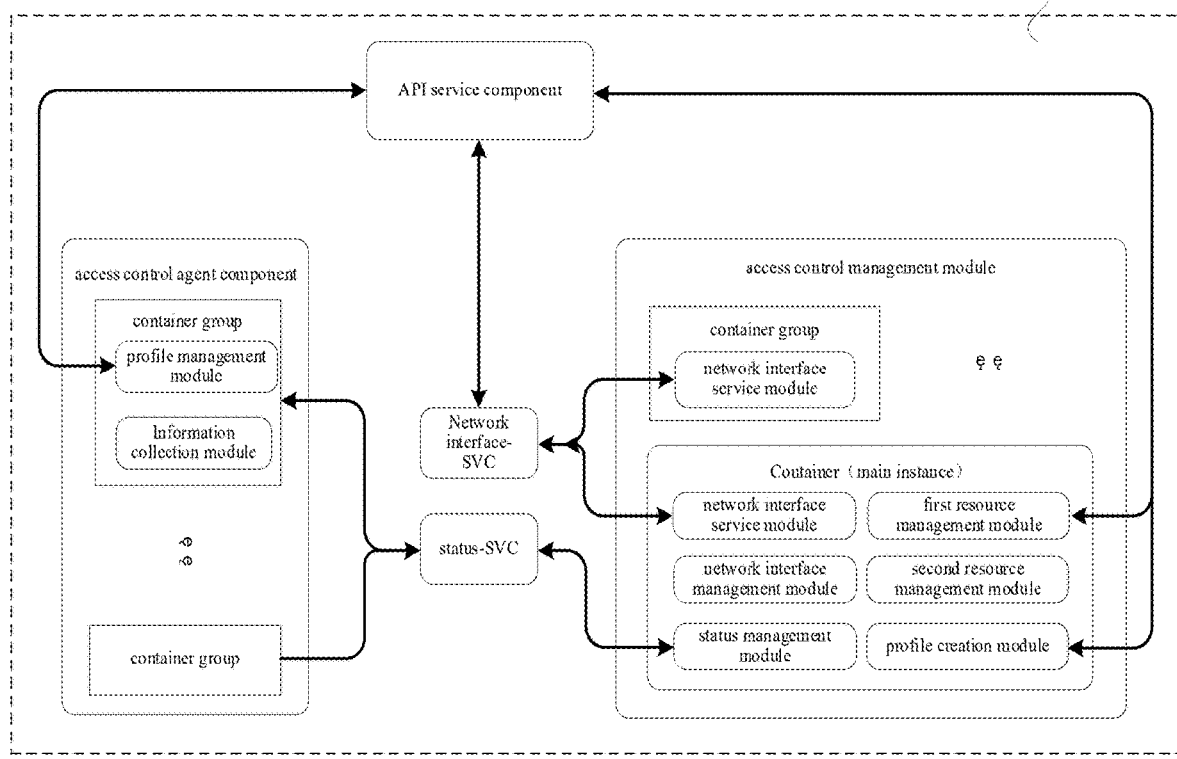

FIG. 2

```
providing at least one type of container security protection profile that
allow users to select and configure                                          — S11 receiving a profile configuration request initiated based on at least one
container security protection profile of the at least one type of container  — S12
security protection profile in response to the profile configuration request, enabling the target
container security protection profile for the target protection object, to
monitor access requests to the target protection object, and perform access  — S13
control on the access requests based on the target container security
protection profile
```

FIG. 3 cription># CONTAINER OPERATION CONTROL METHOD AND APPARATUS

CROSS-REFERENCE TO RELATED APPLICATIONS

The present application is a national phase application of PCT/CN2023/096771 filed May 29, 2023, which claims priority to and is based on a Chinese application with an application number 202210865142.9 and a filing date of Jul. 21, 2022, the aforementioned applications are hereby incorporated by reference in their entireties.

FIELD OF THE INVENTION

The present disclosure relates to the field of computer technology, and in particular to a container operation control method and apparatus.

BACKGROUND

AppArmor is a Mandatory Access Control (MAC) system implemented based on a Linux Security Module (LSM) and is used to restrict the behavior of application processes based on Discretionary Access Control (DAC).

DISCLOSURE OF THE INVENTION

Embodiments of the present disclosure provide a container operation control method and apparatus.

The technical solutions provided by the embodiments of the present disclosure are as follows:

In a first aspect, an embodiment of the present disclosure provides a container operation control method, including:
  providing at least one type of container security protection profile that allow users to select and configure, wherein the at least one type of container security protection profile includes: a container security protection profile based on a container security baseline and/or a container security protection profile for a specified vulnerability in a container environment;
  receiving a profile configuration request initiated based on at least one container security protection profile of the at least one type of container security protection profile, the profile configuration request including a profile identifier of a target container security protection profile and object information about a target protection object related to the container, the profile configuration request being used to request security protection for the target protection object based on the target container security protection profile;
  in response to the profile configuration request, enabling the target container security protection profile for the target protection object, to monitor access requests to the target protection object, and perform access control on the access requests based on the target container security protection profile.

In a second aspect, an embodiment of the present disclosure provides a container operation control apparatus, including:
  an output unit, configured to provide at least one type of container security protection profile that allow users to select and configure, wherein the at least one type of container security protection profile includes: a container security protection profile based on a container security baseline and/or a container security protection profile for a specified vulnerability in a container environment;
  a receiving unit, configured to receive a profile configuration request initiated based on at least one container security protection profile of the at least one type of container security protection profile, the profile configuration request including a profile identifier of a target container security protection profile and object information about a target protection object related to the container, the profile configuration request being used to request security protection for the target protection object based on the target container security protection profile;
  a control unit, configured to, in response to the profile configuration request, enable the target container security protection profile for the target protection object, to monitor access requests to the target protection object, and perform access control on the access requests based on the target container security protection profile.

In a third aspect, an embodiment of the present disclosure provides an electronic device, comprising: a memory and a processor, wherein the memory is configured to store a computer program; and the processor is configured to execute the computer program, so as to cause the electronic device to implement the container operation control method described in any of the above embodiments.

In a fourth aspect, an embodiment of the present disclosure provides a computer-readable storage medium, a computer program, when executed by a computing device, causes the computing device to implement the container operation control method described in any of the above embodiments.

In a fifth aspect, an embodiment of the present disclosure provides a computer program product which, when running on a computer, causes the computer to implement the container operation control method described in any of the above embodiments.

The container operation control method provided by embodiments of the present disclosure first provides at least one type of container security protection profile that allow users to select and configure, then receive a profile configuration request initiated based on at least one container security protection profile of the at least one type of container security protection profile, in response to the profile configuration request, enables the target container security protection profile for the target protection object, and monitor access requests to the target protection object, and perform access control on the access requests based on the target container security protection profile.

DESCRIPTION OF THE DRAWINGS

The accompanying drawings, which are incorporated in and constitute a part of this specification, illustrate embodiments according to the present disclosure, and together with the description, serve to explain the principles of the present disclosure.

In order to more clearly illustrate the technical solutions in the embodiments of the present disclosure or related technologies, the drawings required for use in the embodiments or related technical descriptions are briefly introduced below, and it is obvious for ordinary skilled in the art that other drawings can be derived based on these drawings without paying any creative labor.

FIG. 2 is a second architecture diagram of the container operation control method provided by an embodiment of the present disclosure;

FIG. 3 is a first interactive flowchart diagram of the container operation control method provided by an embodiment of the present disclosure;

DETAILED DESCRIPTION OF PREFERRED EMBODIMENTS

Figure 1:
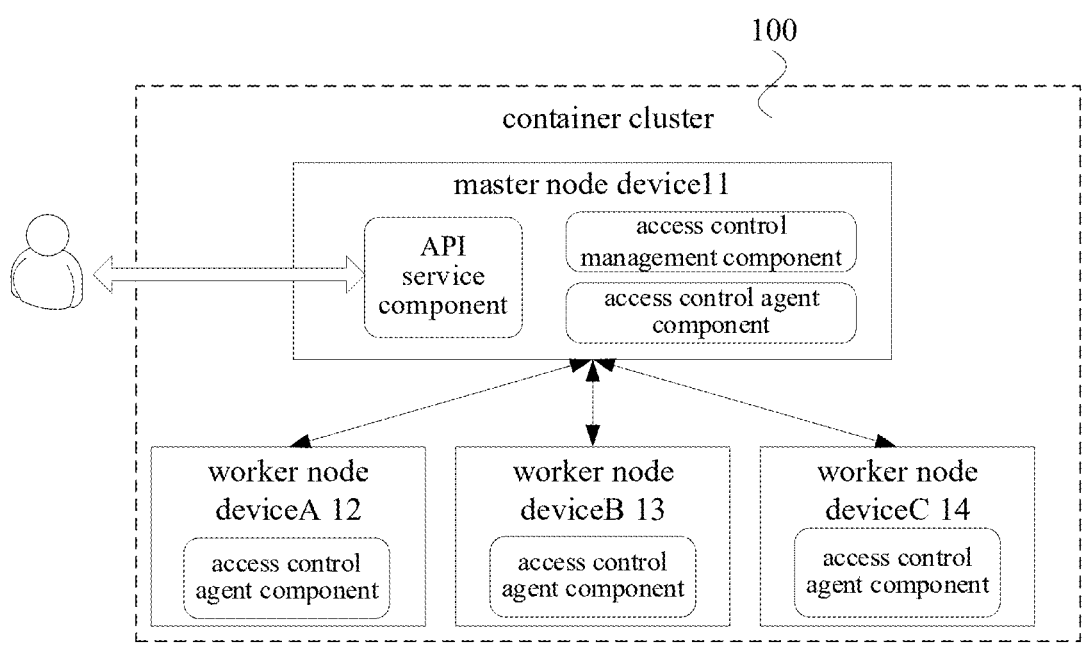
FIG. 1 is a first architecture diagram of the container operation control method provided by an embodiment of the present disclosure.

In order to more clearly understand the above objects, features and advantages of the present disclosure, the scheme of the present disclosure will be further described below. It should be noted that, in the absence of conflict, the embodiments of the present disclosure and the features therein may be combined with each other.

In the following description, many specific details are set forth to facilitate a full understanding of the present disclosure, but the present disclosure may also be implemented in other ways different from those described herein; it is obvious that the embodiments in the specification are only part of the embodiments of the present disclosure, rather than all of the embodiments.

In embodiments of the present disclosure, words such as "exemplary" or "for example" are used to indicate examples, instances or illustrations. Any embodiment or design scheme described as "exemplary" or "for example" in the embodiments of the present disclosure should not be construed as preferred or advantageous over other embodiments or designs. Rather, invocations of words such as "exemplary" or "such as" are intended to present relevant concepts in a concrete manner. Furthermore, in the description of the embodiments of the present disclosure, unless otherwise specified, "plurality" means two or more.

Currently, cloud products usually adopt default universal security protection strategies, which have relatively weak protection capabilities, resulting in serious container security risks, if users want to improve security protection capabilities, they need to write their own security protection strategies for configuration, however, writing and configuring strategies face very high technical thresholds, and are difficult to implement universally. Therefore, a container security solution with higher applicability and security is required.

AppArmor restricts the behavior of a process by, on a kernel call path of the process, acquiring a container security protection profile (AppArmor Profile) that the process should follow based on a process security context label, and then performing mandatory access control based on the container security protection profile to decide whether to allow the process to perform a corresponding operation. Currently, when a mainstream container operates, the component may have a built-in default container security protection profile (Default AppArmor Profile), during the runtime when the component detects that the operating system supports AppArmor, it will enable sandbox protection for a container based on the default container security protection profile when the container is built. However, since the default container security protection profile needs to be applicable to various scenarios, it only contains very basic container security protection policies, which results in the protection strength of AppArmor being very limited, and during the container operates, component will not enable protection for a privileged container.

To enhance the protection strength of AppArmor, a certain container cluster, such as Kubernetes, etc., already supports setting a custom container security profile for a workload. However, current container clusters do not provide management and loading of custom container security policies. Before enabling a custom container security protection profile for a protection object, users are required to complete the writing, testing, loading, and configuration of the custom container security protection policies, then the custom container security protection policies can be used for security protection for custom container of a workload, which has a high threshold for use. To solve the above problem, the container operation control method provided in an embodiment of the present disclosure pre-creates at least one type of container security protection profile that allow users to select and configure, when a user needs to perform access control on the target protection object through a custom container security protection profile (target container security protection profile), the user only needs to select the container security protection profile to be used from the container security protection policies that allow users to select and configure provided by the container cluster, and carry a profile identifier of the container security protection profile to be used in the profile configuration request, then the container cluster can obtain the corresponding container security protection profile according to the profile identifier carried in the profile configuration request, and then enable the container security protection profile for the target protection object, to monitor an access request to the target protection object, and perform access control on the access request of the target protection object based on the container security protection profile to be used, there is no need for the user to write, test, load, and configure a custom container security protection profile, therefore, the embodiment of the present disclosure can lower the threshold for using containers in the container cluster corresponding to AppArmor for security protection.

The following first describes a scenario architecture of the container operation control method provided by an embodiment of the present disclosure.

Referring to FIG. 1, the scenario architecture of the container operation control method provided by the embodiment of the present disclosure includes: a container cluster 100.

The container cluster 100 includes: a master node device 11 and multiple worker node devices. In FIG. 1, the container cluster 100 includes a worker node device A 12, a worker node device B 13, and a worker node device C 14, as an example.

The master node device 11 runs an application programming interface (API) service component, an access control management component (Manager) and an access control agent component (Agent) for a container cluster, and each worker node device runs an access control agent component thereon. The access control management component belongs to a stateless service, is deployed in Deployment mode, and enables multiple copies, its main functions include: 1. managing custom resources as a Custom Resource Define (CRD) management module; 2. communicating with the access control agent component as a server to manage resource status; 3. creating a container security protection profile for a workload; 4. serving as an admission control network interface server (admission controller webhook server), mutating the configuration information of the workload according to the built container security protection profile, specifying the container security protection profile for the workload, and thus enabling sandbox protection for the workload. The access control agent component belongs to a stateless service and is deployed to each node device in the container cluster in DaemonSet mode. The main functions of the access control agent component include: 1. monitoring CRD resources to manage container security protection policies; 2. managing extended Berkeley Packet Filter (eBPF) & audit function (auditd) to monitor and collect workload behaviors; 3. feedbacking the status and behavior information to the master node device.

Further, referring to FIG. 2 which is schematic structural diagram of another type of container cluster. The container cluster 100 includes: an API service component, an access control management component, and an access control agent component.

Among them, the access control management component mainly includes the following functional modules:
1. Network interface service module (Webhook Server): this module is managed by all instances of the access control management component. It is mainly used to: maintain the container security protection profile cache, receive admission request initiated by the API service component, and mutate the configuration information about the workload according to the container security protection profile to be used when the workload is built or updated, so as to set the container security protection profile (AppArmor Profile) to be used for the workload.
2. Network interface service management module (Webhook Manager): This module is managed by a main instance of the access control management component, and is mainly used to perform management, generation and updating of certificate for the network interface configuration of the container cluster, register mutating network interface configuration (Mutating Webhook Configuration) resources, etc., for the Webhook Server, and dynamically adjust matching rules for the network interfaces according to the configured container security protection profile, thereby determining which access requests will be sent from the API service component to the network interface service.
3. Status management module (Status Manager): This module is managed by the main instance of the access control management component and is used to manage a status service. The status service is used to receive status reporting information from the access control agent component, and maintain component status, the status of container security protection profile for each node device, or the like.
4. First resource management module (VarmorPolicy Operator): This module is managed by the main instance of the access control management component and is mainly used to manage a first type of custom resources (VarmorPolicy) in the container cluster. The way in which the first resource management module manages the first type of custom resources includes: in response to creation of the first type of custom resources, calling a profile creation module (Profile Builder) to generate a container security protection profile, then creating corresponding second type of custom resources (ArmorProfile), and maintaining the status of the second type of custom resources.
5. Second resource management module (ArmorPolicy Operator): This module is managed by the main instance of the access control management component and is mainly used to maintain the status of the second type of custom resources in the cluster.
6. Profile creation module (Profile Builder): This module is managed by the main instance of the access control management component; the profile creation module generates container security protection policies based on the first type of custom resources built by the user and encapsulates them into the second type of custom resources.

The access control agent component mainly includes the following functional modules:
1. Profile Management Module (Profile Manager): This module is managed by the access control agent component on each node device in the container cluster, is responsible for monitoring the resource objects of the second type of custom resources and managing the creation, updating, loading, and unloading of container security protection policies on a host machine based on definitions of the monitored resource objects of the second type of custom resources.
2. Information recording module (Recorder): This module is managed by the access control agent component on each node device in the container cluster, and is responsible for collecting status and behavior information of the node devices and containers, and reporting it to the access control management component.

An execution subject of the container operation control method provided in the embodiment of the present disclosure may be a container cluster; for example: Kubernetes (abbreviated as K8s or Kube).

Based on the above system architecture, an embodiment of the present disclosure provides a container operation control method. As shown in FIG. 3, the container operation control method may include the following steps:

S11. providing at least one type of container security protection profile that allow users to select and configure.

Wherein the at least one type of container security protection profile includes: a container security protection profile based on a container security baseline and/or a container security protection profile for a specified vulnerability in a container environment.

In some embodiments, the container cluster may provide the user with at least one type of container security protection profile that allow users to select and configure through a profile selection-configuration interface.

The container security baseline in the embodiment of the present disclosure refers to a minimum-security requirement in the container environment.

In a scenario where a container cluster is running, the security of the container cluster is strongly related to the workloads and resources deployed in the container cluster. Unsafe workload configurations can bring varying degrees of security risks, some of which can even directly cause serious hazards such as container escape. Therefore, configuration information about the workload is an important factor affecting the security of a container cluster. The security standard and practice for a container cluster provide requirements and guidance for the secure configuration of workload to reduce security risks introduced by the workload configuration information and ensure the isolation of the container. However, in a large number of production environments, such these important security requirements are still not followed or cannot be followed due to various reasons. For example: privileges are configured for workloads without following the least privilege principle, privileges are incorrectly configured due to lack of understanding of related security risks, and some components require privileges to operate normally. These workloads that do not meet the security baseline will impact a greater potential safety hazard to the cluster. Based on this, the present disclosure provides, in some embodiments, container security protection strategies based on container security baselines for users to select and configure, so that users can reinforce workloads with security risks, thereby providing protection capabilities before the workloads are redesigned, rectified, and redeployed, thereby achieving goals of blocking attack vectors commonly used by attackers, increasing utilization costs, and enhancing container isolation.

As an optional implementation of the embodiment of the present disclosure, the container security protection strategy based on the container security baseline includes at least one of the following container security protection strategies ①-⑩:

①. It is prohibited to rewrite kernel parameters of the host.
   The path of kernel parameters of the host is /proc/sys/kernel/core_pattern, therefore, the host's kernel parameters can be prohibited from being rewritten by prohibiting rewriting of files with the file path of /proc/sys/kernel/core_pattern, thereby blocking the container escaping due to rewriting the host's kernel parameters.

②. It is prohibited to mount a process file system (procfs) with read and write permissions.

③. It is prohibited to mount the host disk device with read and write permissions.

④. It is prohibited to read and write the host disk device.

⑤. It is prohibited to rewrite an agent release file of a subsystem of the host control group.

⑥. It is prohibited to mount a subsystem of the host control group;

⑦. It is prohibited to use specified privileged capabilities.
   The privileged capabilities include CAP_AUDIT_CONTROL, CAP_AUDIT_READ, CAP_AUDIT_WRITE, CAP_BLOCK_SUSPEND, etc., therefore, it is prohibited to use each privileged capability separately as a container security protection strategy, or privileged capabilities can be combined, and it is prohibited to use multiple privileged capabilities after combination as a container security protection strategy.

⑧. It is prohibited to use privileged capabilities in a namespace.
   That is, any privileged capability is prohibited from being used within the namespace.

⑨. It is prohibited to use specified privileged capabilities in a namespace. Similarly, it is prohibited to use each privileged capability separately as a container security protection strategy in the namespace, or privileged capabilities can be combined, and it is prohibited to use multiple privileged capabilities after combination as a container security protection strategy in the namespace.

⑩. It is prohibited to use AF_PACKET protocol family to create sockets.

That is, the container security protection strategies based on the container security baseline and their security protection effects can be shown in Table 1 below:

TABLE 1

| container security protection strategy | security protection effect of container security protection strategy |
|---|---|
| Forbidden to rewrite kernel parameters of the host | block container escaping due to rewriting the host's kernel parameters |
| Forbidden to mount a process file system with read and write permissions | block mounting a process file system (procfs) with read and write permissions and carrying out information leakage and container escaping |
| Forbidden to mount the host disk device with read and write permissions | block mounting the host disk device and carrying out host information leakage and/or container escaping (Note: the path of the magnetic disk can be acquired dynamically, such as /dev/sda*) |
| Forbidden to read and write the host disk device | block reading and writing files in disk through writing and reading the host disk device and carry outing host information leakage and/or container escaping |
| Forbidden to rewrite an agent release file of a subsystem of the host control group | block carrying out container escaping by rewriting agent releasing file of a sub-system of a host control group (/sys/fs/cgroup/*/release-agent in cgroups) |
| Forbidden to mount a subsystem of the host control group | block carrying out container escaping by mounting the sub-system in a host device control group |
| Forbidden to use specified privileged capabilities | forbidden to strengthen container and reduce attack face by using one or more of following privileged capabilities CAP_AUDIT_CONTROL, CAP_AUDIT_READ, CAP_AUDIT_WRITE, CAP_BLOCK_SUSPEND, CAP_BPF, CAP_CHECKPOINT_RESTORE, CAP_CHOWN, CAP_DAC_OVERRIDE, CAP_DAC_READ_SEARCH. CAP_FOWNER, CAP_ESETID, CAP_IPC_LOCK, CAP_IPC_OWNER, CAP_KILL, CAP_LEASE, CAP_LINUX_IMMUTABLE, CAP_MAC_ADMIN, CAP_MAC_OVERRIDE, CAP_MKNOD, CAP_NET_ADMIN, CAP_NET_BIND_SERVICE, CAP_NET_BROADCAST, CAP_NET_RAW, CAP_PERFMON, CAP_SETGID, CAP_SETFCAP, CAP_SETPCAP. CAP_SETDID, CAP_SYS_ADMIN, CAP_SYS_BOOT, CAP_SYS_CHROOT, CAP_SYS_MODULE, CAP_SYS_NICE, CAP_SYS_PACCT, CAP_SYS_PTRACE, CAP_SYS_RAWIO, CAP_SYS_RESOURCE, CAP_SYS_TIME, CAP_SYS_TTY_CONFIG, CAP_SYSLOG, CAP_WAKE_ALARM |
| Forbidden to use privileged capabilities in a namespace | |
| Forbidden to use specified privileged capabilities in a namespace | |

TABLE 1-continued

| | |
|---|---|
| Forbidden to use AF_PACKET protocol family to build sockets | block using AF_PACKET protocol family to build sockets and perform network sniffing |

Software vulnerabilities cannot be completely eliminated and will continue to emerge as software changes. In the rapidly developing cloud-native field, some newly discovered vulnerabilities (0day vulnerabilities) with serious consequences often appear. Some of these software vulnerabilities can only be fixed by migrating services and restarting the host or container, while some are caused by design flaws in related components and lack a thorough repair solution, and yet others are even introduced by the features or functions of the software and cannot be fixed. These different types of vulnerabilities may pose security risks to the user's online environment due to reasons such as difficulty in repairing, long repair cycles, and inability to repair completely, and so on. The method and system provided by the present disclosure can block or mitigate (increase the cost of vulnerability exploitation) the exploitation (attack) of some specific vulnerabilities through a sandbox mechanism, thereby minimizing the security risks in the window period before the vulnerability is fixed.

As an optional implementation of the embodiment of the present disclosure, the container security protection strategy for a specified vulnerability in a container environment includes at least one of the following container security protection strategies I-X:

I. it is prohibited to read the credential for communicating with the container cluster's API service.

The path of the credential for communicating with the container cluster's API service is/run/secrets/kubernetes.io/serviceaccount/token, therefore, by prohibiting the reading of the file with the file path/run/secrets/kubernetes.io/serviceaccount/token, an attack method of acquiring the credential for communicating with the container cluster's API service can be blocked.

II. it is prohibited to read the path of the container in the host machine.

The path of the container in the host is generally stored in files with the paths /proc/mounts, /proc/[PID]/mounts, and/proc/[PID]/mountinfo, therefore, the reading of the path of the container in the host can be blocked by prohibiting reading of files with the paths/proc/mounts, /proc/[PID]/mounts, and/proc/[PID]/mountinfo.

III. It is prohibited to read the disk device number of the host machine.

IV. It is prohibited to read the network protocol IP address of the host machine.

V. It is prohibited to execute specified executable files.

The executable files specified in the embodiment of the present disclosure can be set according to the executable file to be used in each attack manner. Exemplarily, the specified executable files may include: /bin/sh file, /bin/bash file, /bin/dash file, /bin/busybox file, /usr/bin/wget file, /bin/wget file, etc.

VI. It is prohibited to modify file permissions.

VII. It is prohibited to rewrite the directory and configuration files of system configuration files.

VIII. It is prohibited to escalate permissions.

IX. It is prohibited to perform local inter-process communication via UNIX sockets.

X. It is prohibited to access to specified files through NGINX service.

In the embodiment of the present disclosure, any file that needs to be kept strictly confidential or that would cause serious consequences if stolen can be set as a specified file. For example, the specified files may include: the path of the container in the host machine, the IP address of the host machine, the MAC address of the host machine, etc.

TABLE 2

| container security protection strategy | security protection effect of container security protection strategy |
|---|---|
| prohibited to read credential for communicating with API service of container cluster | block acquiring credential for communicating with API service of container cluster by reading the file with the file path /run/secrets/kubernetes.io/serviceaccount/token |
| prohibited to read path of container in the host machine | block acquiring path of container in the host machine by reading files such as /proc/mounts, /proc/[PID]/mounts, and /proc/[PID]/mountinfo |
| prohibited to read disk device number of the host machine | block acquiring disk device number of the host machine by reading files such as /proc/[PID]/mountinfo, /proc/partitions |
| prohibited to read network protocol IP address of the host machine | block acquiring the host IP by reading files such as /proc/net/arp, /proc/[PID]/net/arp |
| prohibited to execute specified executable files | the executable files may include one or more of: /bin/sh file, /bin/bash file, /bin/dash file, /bin/busybox file, /usr/bin/wget file, /bin/wget file, to block shell utilization, downloading of external files, issuance of network request |
| prohibited to modify file permissions | block modifying file permissions by executing /bin/chmod (Note: in some scenarios, it shall be utilized along with a category "prohibited to execute busybox command") |
| prohibited to rewrite configuration file directory and configuration files | block writing operation on configuration file directory (/etc directory) and configuration file (/etc) to prevent attacks such as premission escalation, persistence |
| prohibited to escalate permissions | block writing operation on configuration file directory (/etc directory) to prevent attacks such as premission escalation, persistence |

TABLE 2-continued

| | |
|---|---|
| prohibited to perform local inter-process communication via UNIX sockets | mitigate attack utilizing CVE-2020-15257 vulnerability |
| prohibited to access to specified files through NGINX service | mitigate attack utilizing vulnerability of Kubernetes Ingress-nginx component |

S12. receiving a profile configuration request initiated based on at least one container security protection profile of the at least one type of container security protection profile.

Wherein the profile configuration request including a profile identifier of a target container security protection profile and object information about a target protection object related to the container, the profile configuration request being used to request security protection for the target protection object based on the target container security protection profile.

In the embodiment of the present disclosure, the target protection object may be a specific workload or a container group or a container or an application in a container. In actual use, the target protection object can be specified through information about the workload or container group or container or application, such as, label, type, namespace, name and other. That is, the object information of the target protection object may be a label, type, namespace, name, etc. of a workload or a container group or a container or an application.

In the embodiment of the present disclosure, the target protection object may also be a workload or a container group or a container or an application that meets preset conditions, and the target protection object can be specified by setting the preset conditions. When creating a workload, it can be determined whether the currently built or built workload or container group or container or application belongs to the target protection object by judging whether the workload or container group or container or application meets the preset conditions. That is, the object information of the target protection object may be the condition that the target protection object needs to meet.

S13. in response to the profile configuration request, enabling the target container security protection profile for the target protection object, to monitor access requests to the target protection object, and perform access control on the access requests based on the target container security protection profile.

The container operation control method provided by the embodiment of the present disclosure first provides at least one type of container security protection profile that allow users to select and configure, then receives a profile configuration request initiated based on at least one container security protection profile of the at least one type of container security protection profile, in response to the profile configuration request, enable the target container security protection profile for the target protection object, to monitor access requests to the target protection object, and perform access control on the access requests based on the target container security protection profile. Since the container operation control method provided by the embodiment of the present disclosure provides a user with at least one type of container security protection profile that allow users to select and configure, when the user needs to perform access control on a target protection object through a target container security protection profile, the user only needs to select the target container security protection profile from the provided container security protection profiles that allow users to select and configure, without needing to write the target container security protection profile, therefore, the embodiment of the present disclosure can reduce the user's writing of container security protection policies, thereby lowering the threshold for using container sandbox protection.

As an optional implementation of the embodiment of the present disclosure, the above step S13 (in response to the profile configuration request, enable the target container security protection profile for the target protection object) includes:

based on the object information of the target protection object, enabling the target container security protection profile for the container group of the target protection object, the container of the target protection object, or the application of the target protection object.

That is, the minimum access control granularity for the target container security protection profile in the embodiment of the present disclosure is an application in the container.

Although the above at least one type of container security protection profile that allow users to select and configure provided by the container cluster can provide security protection against specific risks or specific attack manners, in some cases the container security protection profile may conflict with the needs of the application service itself, resulting in the normal operation of the application service being blocked by the container security protection profile. For example, an application service may need to read a credential (Service Account token) for communicating with the container cluster's API service and then interact with the container cluster's API service, while if the target container security profile includes a container security profile that prohibits reading the credential for communicating with the container cluster's API service, the container security profile will prevent the application service from reading the credential for communicating with the container cluster's API service, thereby causing that the application service cannot interact with the API service. For another example, an application service may need to execute a bash executable file, if a container security protection profile that prohibits the execution of bash executable files is selected, the container security protection profile will prevent the application service from executing bash.

The target protection object of the target container security protection strategy described in the above embodiment can be a container group of the target protection object or a container in the container group or an application in the container. Therefore, the above embodiment can enable the target container security protection strategy for only the container group or container or application that will not conflict with the behavior of the application service itself, thereby blocking penetration and increasement of penetration costs without affecting the normal operation of the application service.

Figure 4:
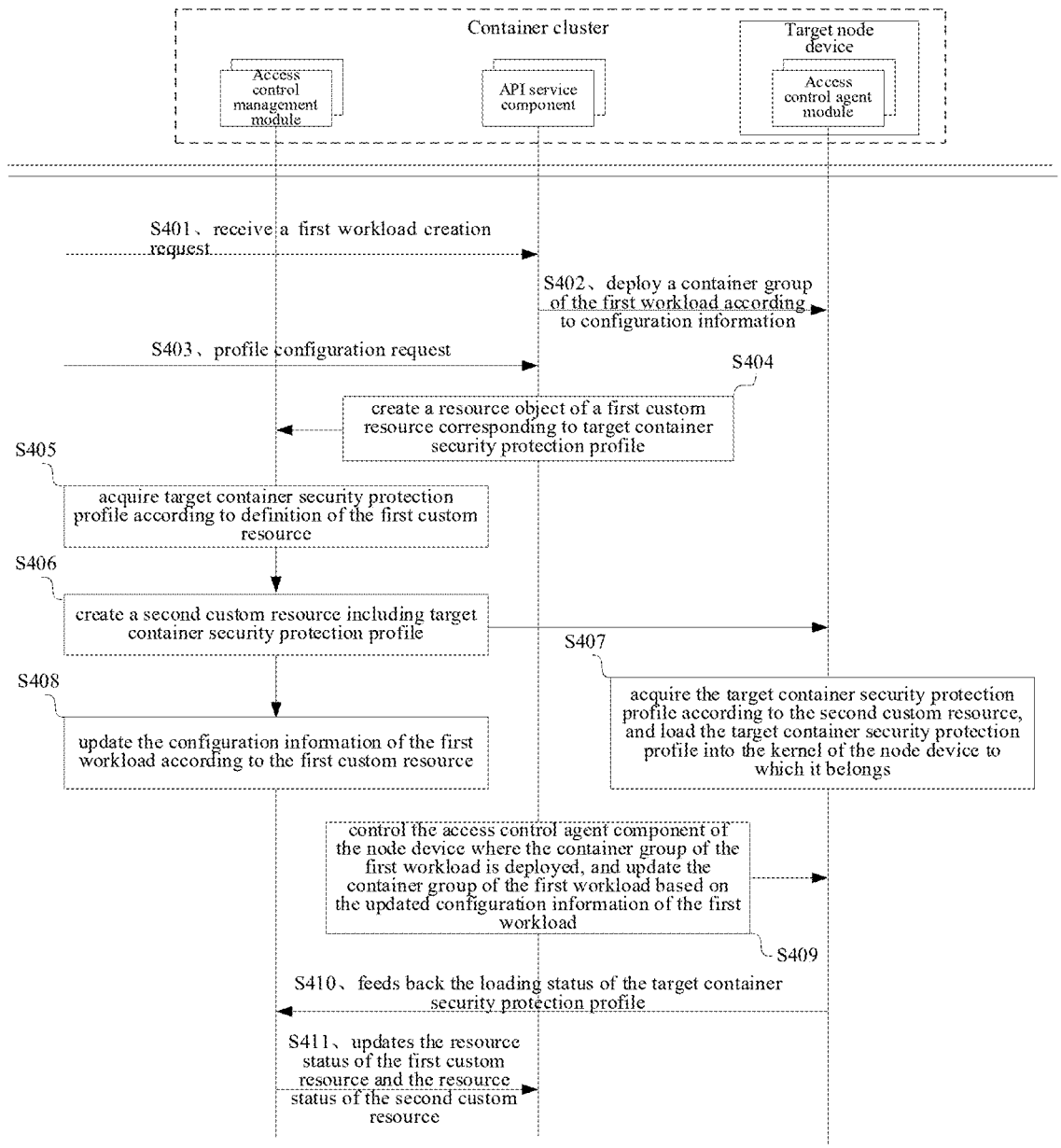
FIG. 4 is a second interactive flowchart diagram of the container operation control method provided by an embodiment of the present disclosure.

As an expansion and refinement of the above embodiment, the present disclosure provides another container operation control method. As shown in FIG. 4, the container operation control method includes:

S401: An API service component of a container cluster receives a first workload creation request.

Where, the first workload creation request carries configuration information of the first workload, and is used to request creation of the first workload according to the configuration information.

The first workload in the embodiment of the present disclosure may be a resource of a namespace type such as Deployment, DaemonSet, or StatusfulSet, etc., and the system interfaces that also are of the namespace type may correspond one-to-one with the workloads.

S402: The API service component deploys a container group of the first workload on at least one target node device of the container cluster according to the configuration information.

It should be noted that the target node device may be a master node device in the container cluster, or a worker node device in the container cluster, or may include both a master node device and a worker node device.

S403: The API service component receives a profile configuration request.

Among them, the profile configuration request includes a profile identifier of the target container security protection profile and object information of a target protection object related to the container, and the profile configuration request is used to request security protection for the target protection object based on the target container security protection profile; the target protection object includes the first workload.

S404. The API service component creates a resource object of a first custom resource corresponding to the target container security protection profile.

Since the definition of the first custom resource includes declaration information of each target protection object, the definition of the first custom resource includes declaration information of the first workload.

The first custom resource in the embodiment of the present disclosure is a first type of custom resource (VarmorProfile), and may be a namespace type of resource that is consistent with the namespace of the target protection object. The target protection object is used to define the workload to be performed access control, and may include: resource type, name, container group/container/application name list, or label selector, to enable sandbox protection for eligible workloads through the label mechanism.

S405. The access control management component of the container cluster acquires the target container security protection profile according to the definition of the first custom resource.

In some embodiments, an access control management component of a container cluster may monitor an object of a resource object of a first custom resource in real time, and in response to the resource object of the first custom resource being created, a target container security protection profile can be acquired according to a definition of the first custom resource.

S406: The access control management component of the container cluster creates a second custom resource including the target container security protection profile.

The target container security protection profile is managed in the container cluster system in a resource manner, so the second custom resource is the target container security protection profile.

In some embodiments, the access control management component encapsulates the target container security protection profile into a second type of custom resource to generate a second custom resource.

As an optional implementation of the embodiment of the present disclosure, the first custom resource, the second custom resource, and the target protection object are resources in the same namespace.

The second custom resource in the embodiment of the present disclosure is a second type of custom resource (ArmorProfile), and is a namespace type of resource that is consistent with the namespace of the target protection object. The second type of custom resource shields underlying logic, is only used in the system internally and is mainly used to define target protection objects and target container security protection policies.

In some embodiments, the first custom resource, the second custom resource, and the target protection object are resources in the same namespace.

Since the first custom resource, the second custom resource, and the target protection object are resources in the same namespace, the embodiment of the present disclosure can allow users to operate the first custom resource in the corresponding namespace and perform access control on the workload in the namespace; at the same time, it can restrict users of other namespaces from operating the first custom resource and the second custom resource in the namespace, thereby further improving the security and usability of the access control scheme.

S407. The access control agent component of the node device (the at least one target node device) in the container cluster, where the container group of the first workload is deployed, acquires the target container security protection profile according to the second custom resource, and loads the target container security protection profile into the kernel of the node device to which it belongs.

S408: The access control management component updates the configuration information of the first workload according to the first custom resource.

It should be noted that the execution order of the above steps S407 and S408 is not limited in the embodiment of the present disclosure, S407 may be executed first and then S408, or S407 and S408 may be executed in parallel.

S409. The API service component controls the access control agent component of the node device (the at least one target node device), where the container group of the first workload is deployed, and updates the container group of the first workload based on the updated configuration information of the first workload.

As an optional implementation of the embodiment of the present disclosure, in the above step S409 (the API service component controls the access control agent component of the node device, where the container group of the first workload is deployed, and updates the container group of the first workload based on the updated configuration information of the first workload), it includes:

in response to the configuration information of the first workload being updated, the API service component controls the node device (the at least one target node device), where the container group of the first workload is deployed, to perform a rolling update on the container group of the first workload.

S410. The access control agent component of the node device, where the container group of the first workload is deployed, respectively feeds back the loading status of the target container security protection profile into the corresponding node device to the access control management component.

S411. The access control management component updates the resource status of the first custom resource and the resource status of the second custom resource according to the loading status of the target container security protection profile fed back by respective node devices, where the container group of the first workload is deployed.

The embodiment shown in FIG. 4 above provides an implementation method for enabling sandbox protection for an existing workload (first workload), and because the above embodiment converts the target container security protection profile into resources in the container cluster, the above embodiment can make the use of the container sandbox cloud-native, thereby obtaining a user experience consistent with that of other resources in the container cluster.

Figure 5:
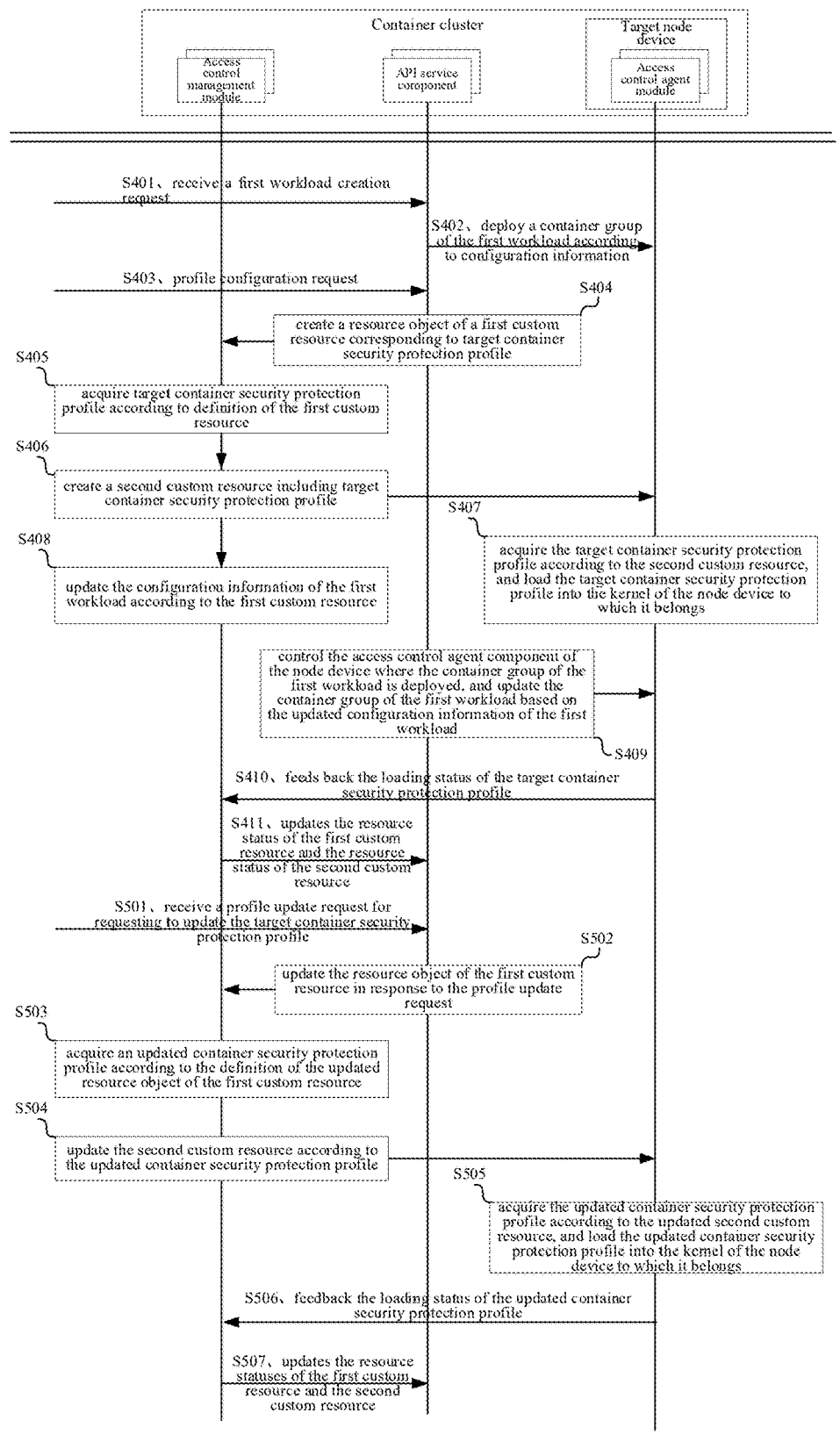
FIG. 5 is a third interactive flowchart diagram of the container operation control method provided by an embodiment of the present disclosure.

As an optional implementation of the embodiment of the present disclosure, as shown in FIG. 5, based on the embodiment shown in FIG. 4 above, the method provided in the embodiment of the present disclosure may further includes the following steps:

S501. The API service component receives a profile update request for requesting to update the target container security protection profile.

S502: The API service component updates the resource object of the first custom resource in response to the profile update request.

S503: The access control management component acquires an updated container security protection profile according to the definition of the updated resource object of the first custom resource.

S504: The access control management component updates the second custom resource according to the updated container security protection profile.

S505. Control the access control agent component of the node device (the at least one target node device) where the container group of the target protection object is deployed, to acquire the updated container security protection profile according to the updated second custom resource, and load the updated container security protection profile into the kernel of the node device to which it belongs.

S506. Control the access control agent component of the node device (the at least one target node device) where the container group of the target protection object is deployed, to feedback the loading status of the updated container security protection profile into the corresponding node device to the access control management component respectively.

S507: The access control management component updates the resource status of the first custom resource and the second custom resource according to the loading status of the updated container security protection profile into each target node device.

The embodiment shown in FIG. 5 above provides an implementation method for changing the container security protection profile for a workload (first workload) that has sandbox protection enabled, and there is no need to restart the first workload during the change of the first workload, which solves the limitation that the workload must be restarted when changing the container sandbox profile and improves the flexibility when using the container sandbox.

Figure 6:
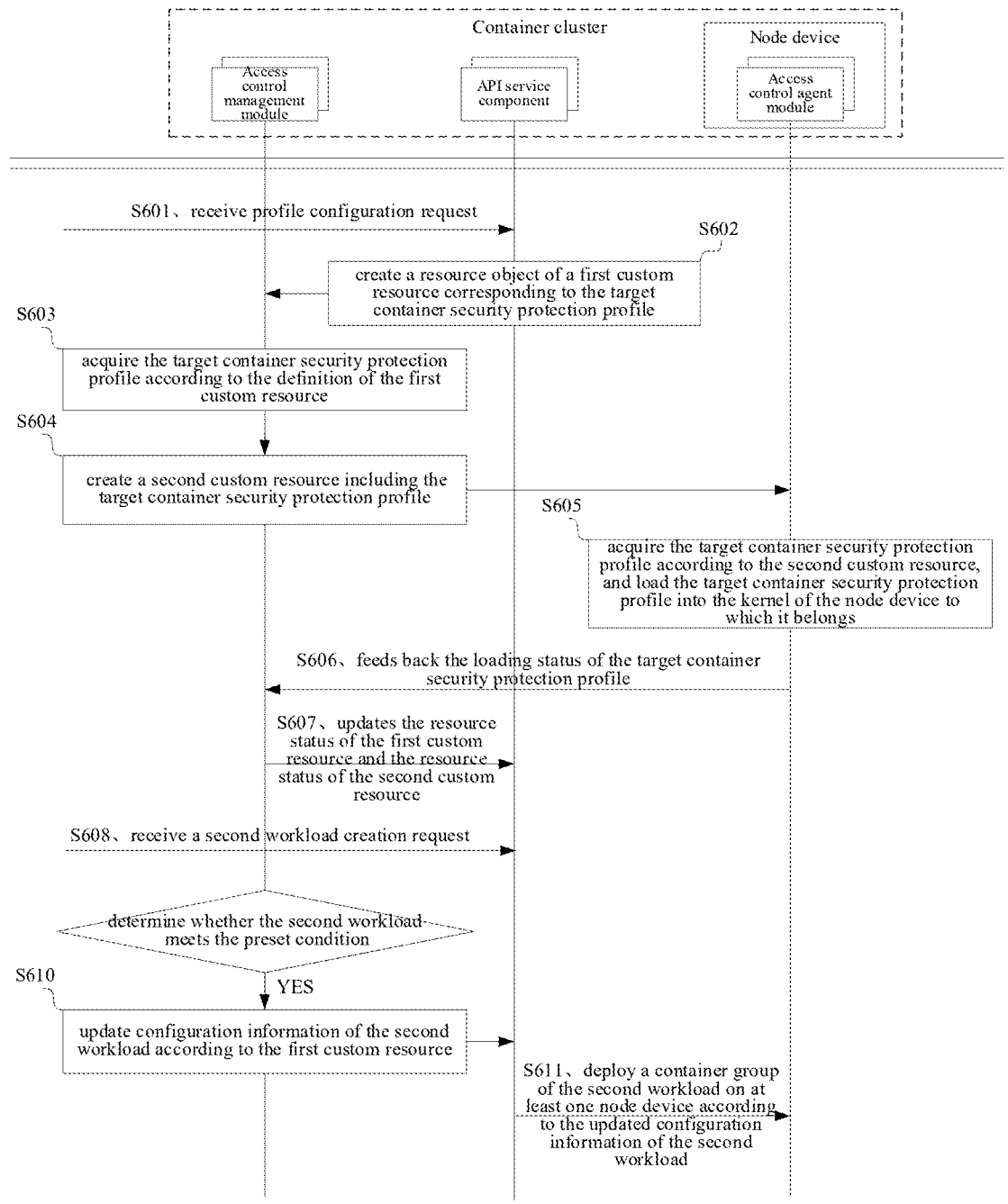
FIG. 6 is a fourth interactive flowchart diagram of the container operation control method provided by an embodiment of the present disclosure.

As an expansion and refinement of the above embodiment, the present disclosure provides another container operation control method. As shown in FIG. 6, the container operation control method includes:

S601: The API service component of the container cluster receives a profile configuration request.

Among them, the profile configuration request includes a profile identifier of the target container security protection profile and object information of a target protection object related to the container, the profile configuration request is used to request security protection for the target protection object based on the target container security protection profile, the target protection object includes a workload that meets a preset condition.

S602. The API service component creates a resource object of a first custom resource corresponding to the target container security protection profile.

S603: The access control management component of the container cluster acquires the target container security protection profile according to the definition of the first custom resource.

S604: The access control management component of the container cluster creates a second custom resource including the target container security protection profile.

So far, the resources including the target container security protection profile are created.

S605: The access control agent component of each node device of the container cluster acquires the target container security protection profile according to the second custom resource, and loads the target container security protection profile into the kernel of the node device to which it belongs.

S606: The access control agent component of each node device of the container cluster feeds back the loading status of the target container security protection profile into the corresponding node device to the access control management component.

S607: The access control management component updates the resource status of the first custom resource and the resource status of the second custom resource according to the loading status of the target container security protection profile fed back by each node device.

S608. The API service component receives a second workload creation request.

The second workload creation request carries configuration information of the second workload, and is used to request creation of the second workload according to the configuration information.

S609: The access control management component determines whether the second workload meets the preset condition.

If the access control management component determines that the second workload does not meet the preset condition, the container group of the second workload is directly deployed on at least one node device of the container cluster according to the configuration information, just like the existing workload creation scheme, if the access control management component determines that the second workload meets the preset condition, the following steps are executed:

S610. The access control management component updates configuration information of the second workload according to the first custom resource.

S611. The API service component deploys a container group of the second workload on at least one node device according to the updated configuration information of the second workload.

The embodiment shown in FIG. 6 above provides a solution of first defining a protection strategy (target container security protection strategy), and when a workload (the second workload) that meets the condition is created, then enabling sandbox protection for the workload.

It should be noted that, based on the embodiment shown in FIG. 6, the container operation control method provided by the present disclosure can also change the container security protection strategy for the second workload. The implementation scheme for changing the container security protection profile (target container security protection profile) for the second workload is similar to the embodiment shown in FIG. 5, and to avoid redundancy, it will not be repeated here.

Based on the same inventive concept, as an implementation of the above method, the embodiment of the present disclosure also provides a container operation control apparatus, which corresponds to the above method embodiment, for ease of reading, this embodiment will no longer repeat the details of the above method embodiment one by one, but it should be clear that the container operation control apparatus in this embodiment can correspond to all the contents in the above method embodiment.

Figure 7:
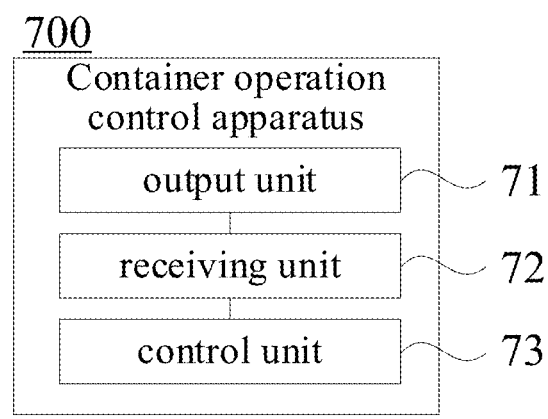
FIG. 7 is a schematic structural diagram of the container operation control apparatus provided by an embodiment of the present disclosure.

The embodiment of the present disclosure provides a container operation control apparatus. FIG. 7 is a schematic structural diagram of the container operation control device. As shown in FIG. 7, the container operation control apparatus 700 includes:

an output unit 71, configured to provide at least one type of container security protection profile that allow users to select and configure, wherein the at least one type of container security protection profile includes: a container security protection profile based on a container security baseline and/or a container security protection profile for a specified vulnerability in a container environment;

a receiving unit 72, configured to receive a profile configuration request initiated based on at least one container security protection profile of the at least one type of container security protection profile, the profile configuration request including a profile identifier of a target container security protection profile and object information about a target protection object related to the container, the profile configuration request being used to request security protection for the target protection object based on the target container security protection profile;

a control unit 73, configured to, in response to the profile configuration request, enable the target container security protection profile for the target protection object, to monitor access requests to the target protection object, and perform access control on the access requests based on the target container security protection profile.

As an optional implementation of the embodiment of the present disclosure, the container security protection strategy based on the container security baseline includes at least one of the following container security protection strategies:

It is prohibited to rewrite kernel parameters of a host.
It is prohibited to mount a process file system with read and write permissions.
It is prohibited to mount a host disk device with read and write permissions.
It is prohibited to read and write the host disk device.
It is prohibited to rewrite an agent release file of a subsystem of the host control group.
It is prohibited to mount a subsystem of the host control group; It is prohibited to use specified privileged capabilities.
It is prohibited to use privileged capabilities in a namespace.
It is prohibited to use specified privileged capabilities in a namespace.
It is prohibited to use AF_PACKET protocol family to create sockets.

As an optional implementation of the embodiment of the present disclosure, the container security protection strategy for a specified vulnerability in a container environment includes at least one of the following container security protection strategies:

It is prohibited to read the credential for communicating with the container cluster's API service.
It is prohibited to read the path of the container in the host machine.
It is prohibited to read the disk device number of the host machine.
It is prohibited to read the network protocol IP address of the host machine.
It is prohibited to execute specified executable files.
It is prohibited to modify file permissions.
It is prohibited to rewrite the directory and configuration files of system configuration files.
It is prohibited to escalate permissions.
It is prohibited to perform local inter-process communication via UNIX sockets.
It is prohibited to access to specified files through NGINX service.

As an optional implementation of the embodiment of the present disclosure, the control unit 73 is specifically configured to enable the target container security protection profile for the container group of the target protection object or the container of the target protection object or the application of the target protection object based on the object information of the target protection object.

As an optional implementation of the embodiment of the present disclosure,

The receiving unit 71 is specifically configured to receive a profile configuration request through an API service component of the container cluster;

The control unit 73 is further configured to, before in response to the profile configuration request, enable the target container security protection profile for the target protection object, create a resource object of a first custom resource corresponding to the target container security protection profile through the API service component, acquire the target container security protection profile according to the definition of the first custom resource, and create a second custom resource including the target container security protection profile through the access control management component of the container cluster.

As an optional implementation of the embodiment of the present disclosure, the first custom resource, the second custom resource, and the target protection object are resources in the same namespace.

As an optional implementation of the embodiment of the present disclosure, the target protection object includes a first workload created in the container cluster before the profile configuration request is received;

The control unit 73 is specifically configured to control an access control agent component of a node device in the container cluster where the container group of the first workload is deployed, obtain the target container security protection profile according to the second custom resource, and load the target container security protection profile into the kernel of the node device to which it belongs; update the configuration information of the first workload according to the first custom resource through the access control management component; control the access control agent component of the node device of the container group where the first workload is deployed, and update the container group of the first workload according to the updated configuration information of the first workload.

As an optional implementation of the embodiment of the present disclosure, the target protection object includes a workload that meets a preset condition;

The receiving unit 71 is further configured to, after creating a second custom resource according to the target container security protection profile, receive a second workload creation request through the API service component, the second workload creation request carries configuration information of the second workload, and is used to request creation of the second workload according to the configuration information.

The control unit 73 is specifically configured to, if it is determined that the second workload meets the preset condition, update configuration information of the second workload according to the first custom resource through the access control management component; deploy a container group of the second workload on at least one node device according to the updated configuration information of the second workload through the API service component.

As an optional implementation of the embodiment of the present disclosure,

The receiving unit 71 is further configured to receive, through the API service component, a profile update request for requesting to update the security protection profile of the target container;

The control unit 73 is also used to update the resource object of the first custom resource in response to the profile update request; acquire the updated container security protection profile according to the definition of the updated resource object of the first custom resource through the access control management component, and update the second custom resource according to the updated container security protection profile; control the access control agent component of the node device where the container group of the target protection object is deployed, acquire the updated container security protection profile according to the updated second custom resource, and load the updated container security protection profile into the kernel of the node device to which it belongs.

The container operation control apparatus provided in this embodiment can execute the container operation control method provided in the above method embodiment, their implementation principle and technical effect are similar and will not be repeated here.

Figure 8:
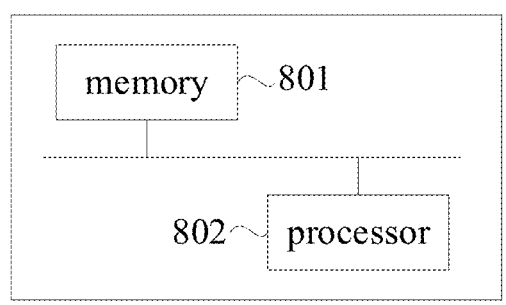
FIG. 8 is a schematic diagram of the hardware structure of an electronic device provided in an embodiment of the present disclosure.

Based on the same inventive concept, an embodiment of the present disclosure also provides an electronic device. FIG. 8 is a schematic structural diagram of an electronic device provided in an embodiment of the present disclosure. As shown in FIG. 8, the electronic device provided in this embodiment includes: a memory 801 and a processor 802, wherein the memory 801 is used to store a computer program; and the processor 802 is used to execute the container operation control method provided in the above embodiment when executing the computer program.

Based on the same inventive concept, an embodiment of the present disclosure further provides a computer-readable storage medium, on which a computer program is stored. When the computer program is executed by a processor, the computing device implements the container operation control method provided in the above embodiments.

Based on the same inventive concept, an embodiment of the present disclosure further provides a computer program product, when the computer program product is executed on a computer, a computing device implements the container operation control method provided in the above embodiments.

Those skilled in the art should appreciate that the embodiments of the present disclosure may be provided as methods, systems, or computer program products. Accordingly, the present disclosure may take the form of an entirely hardware embodiment, an entirely software embodiment, or an embodiment combining software and hardware aspects. Furthermore, the present disclosure may take the form of a computer program product embodied in one or more computer usable storage mediums having computer usable program code embodied therein.

The processor can be a central processing unit (CPU), or other general-purpose processors, digital signal processors (DSP), application-specific integrated circuits (ASIC), field-programmable gate arrays (FPGA) or other programmable logic devices, discrete gate or transistor logic devices, discrete hardware components, etc. A general-purpose processor may be a microprocessor, or the processor may be any conventional processor or the like.

The memory may include non-permanent memory in a computer-readable medium, random-access memory (RAM) and/or non-volatile memory, such as, read-only memory (ROM) or flash RAM. Memory is an example of a computer-readable medium.

Computer readable media include permanent and non-permanent, removable and non-removable storage media. The storage medium can implement information storage by any method or technology, and the information can be computer-readable instructions, data structures, program modules or other data. Examples of computer storage media include, but not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk-read-only memory (CD-ROM), digital versatile disk (DVD) or other optical storage, magnetic cassettes, magnetic disk storage or other magnetic storage devices, or any other non-transmission medium that can be used to store information that can be accessed by a computing device. According to definition in this document, computer-readable media do not include temporary computer-readable media (transitory media), such as modulated data signals and carrier waves.

Finally, it should be noted that the above embodiments are only used to illustrate the technical solutions of the present disclosure, instead of limiting them. Although the present disclosure has been described in detail with reference to the aforementioned embodiments, those skilled in the art should understand that they can still modify the technical solutions described in the aforementioned embodiments, or replace some or all of the technical features therein by equivalents. However, these modifications or replacements do not cause the essence of the corresponding technical solutions to deviate from the scope of the technical solutions of the embodiments of the present disclosure.

What is claimed is:
1. A container operation control method, including:
providing at least one type of container security protection profile that allow users to select and configure, wherein the at least one type of container security protection profile includes: a container security protection profile based on a container security baseline and/or a con- tainer security protection profile for a specified vulnerability in a container environment;

receiving a profile configuration request initiated based on at least one container security protection profile of the at least one type of container security protection profile, through an application programing interface API service component of a container cluster, the profile configuration request including a profile identifier of a target container security protection profile and object information about a target protection object related to the container, the profile configuration request being used to request security protection for the target protection object based on the target container security protection profile;

creating a resource object of a first custom resource corresponding to the target container security protection profile through the API service component;

acquiring the target container security protection profile according to a definition of the first custom resource, and creating a second custom resource including the target container security protection profile, through an access control management component of the container cluster;

enabling the target container security protection profile for the target protection object in response to the profile configuration request, to monitor access requests to the target protection object, and perform access control on the access requests based on the target container security protection profile, the target protection object includes a first workload created in the container cluster before the profile configuration request is received;

the enabling the target container security protection profile for the target protection object in response to the profile configuration request, comprises:

controlling an access control agent component of a node device in the container cluster where the container group of the first workload is deployed, to acquire the target container security protection profile according to the second custom resource, and load the target container security protection profile into a kernel of the node device to which it belongs.

2. The method of claim 1, wherein, the enabling the target container security protection profile for the target protection object in response to the profile configuration request, comprises:

enabling the target container security protection profile for the container group of the target protection object or the container of the target protection object or the application of the target protection object, based on the object information of the target protection object.

3. The method of claim 1, wherein, the first custom resource, the second custom resource, and the target protection object are resources in the same namespace.

4. The method of claim 1, wherein, the method further comprises:

updating configuration information of the first workload according to the first custom resource through the access control management component;

controlling the access control agent component of the node device where the container group of the first workload is deployed, to update the container group of the first workload according to the updated configuration information of the first workload, through the API service component.

5. The method of claim 4, wherein, the method further comprises:

receiving a profile update request for requesting to update the security protection profile of the target container, and updating the resource object of the first custom resource in response to the profile update request, through the API service component;

acquiring the updated container security protection profile according to a definition of the updated resource object of the first custom resource, and updating the second custom resource according to the updated container security protection profile, through the access control management component;

controlling the access control agent component of the node device where the container group of the target protection object is deployed, to acquire the updated container security protection profile according to the updated second custom resource, and load the updated container security protection profile into the kernel of the node device to which it belongs.

6. The method of claim 1, wherein, the target protection object includes a workload that meets a preset condition;

after creating the second custom resource according to the target container security protection profile, the method further comprises:

receiving a second workload creation request through the API service component, the second workload creation request carries configuration information of the second workload, and is used to request creation of the second workload according to the configuration information;

if it is determined that the second workload meets the preset condition, updating configuration information of the second workload according to the first custom resource through the access control management component;

deploying a container group of the second workload on at least one node device according to the updated configuration information of the second workload through the API service component.

7. The method of claim 6, wherein, the method further comprises:

receiving a profile update request for requesting to update the security protection profile of the target container, and updating the resource object of the first custom resource in response to the profile update request, through the API service component;

acquiring the updated container security protection profile according to a definition of the updated resource object of the first custom resource, and updating the second custom resource according to the updated container security protection profile, through the access control management component;

controlling the access control agent component of the node device where the container group of the target protection object is deployed, to acquire the updated container security protection profile according to the updated second custom resource, and load the updated container security protection profile into the kernel of the node device to which it belongs.

8. An electronic device, comprising: a memory and a processor, wherein the memory is configured to store a computer program; and the processor is configured to execute the computer program, so as to cause the electronic device to implement:

providing at least one type of container security protection profile that allow users to select and configure, wherein the at least one type of container security protection profile includes: a container security protection profile based on a container security baseline and/or a container security protection profile for a specified vulnerability in a container environment;

receiving a profile configuration request initiated based on at least one container security protection profile of the at least one type of container security protection profile, through an application programing interface API service component of a container cluster, the profile configuration request including a profile identifier of a target container security protection profile and object information about a target protection object related to the container, the profile configuration request being used to request security protection for the target protection object based on the target container security protection profile;

creating a resource object of a first custom resource corresponding to the target container security protection profile through the API service component; acquiring the target container security protection profile according to a definition of the first custom resource, and creating a second custom resource including the target container security protection profile, through an access control management component of the container cluster;

enabling the target container security protection profile for the target protection object in response to the profile configuration request, to monitor access requests to the target protection object, and perform access control on the access requests based on the target container security protection profile, the target protection object includes a first workload created in the container cluster before the profile configuration request is received:

the enabling the target container security protection profile for the target protection object in response to the profile configuration request, comprises:

controlling an access control agent component of a node device in the container cluster where the container group of the first workload is deployed, to acquire the target container security protection profile according to the second custom resource, and load the target container security protection profile into a kernel of the node device to which it belongs.

9. The electronic device of claim 8, wherein, the enabling the target container security protection profile for the target protection object in response to the profile configuration request, comprises:

enabling the target container security protection profile for the container group of the target protection object or the container of the target protection object or the application of the target protection object, based on the object information of the target protection object.

10. The electronic device of claim 8, wherein, the first custom resource, the second custom resource, and the target protection object are resources in the same namespace.

11. The electronic device of claim 8, wherein, the processor is configured to execute the computer program, so as to cause the electronic device to further implement:

updating configuration information of the first workload according to the first custom resource through the access control management component;

controlling the access control agent component of the node device where the container group of the first workload is deployed, to update the container group of the first workload according to the updated configuration information of the first workload, through the API service component.

12. The electronic device of claim 11, wherein, the processor is configured to execute the computer program, so as to cause the electronic device to further implement:

receiving a profile update request for requesting to update the security protection profile of the target container, and updating the resource object of the first custom resource in response to the profile update request, through the API service component;

acquiring the updated container security protection profile according to a definition of the updated resource object of the first custom resource, and updating the second custom resource according to the updated container security protection profile, through the access control management component;

controlling the access control agent component of the node device where the container group of the target protection object is deployed, to acquire the updated container security protection profile according to the updated second custom resource, and load the updated container security protection profile into the kernel of the node device to which it belongs.

13. The electronic device of claim 8, wherein, the target protection object includes a workload that meets a preset condition;

wherein the processor is configured to execute the computer program, so as to cause the electronic device to further implement, after creating the second custom resource according to the target container security protection profile:

receiving a second workload creation request through the API service component, the second workload creation request carries configuration information of the second workload, and is used to request creation of the second workload according to the configuration information;

if it is determined that the second workload meets the preset condition, updating configuration information of the second workload according to the first custom resource through the access control management component;

deploying a container group of the second workload on at least one node device according to the updated configuration information of the second workload through the API service component.

14. The electronic device of claim 13, wherein, the processor is configured to execute the computer program, so as to cause the electronic device to further implement:

receiving a profile update request for requesting to update the security protection profile of the target container, and updating the resource object of the first custom resource in response to the profile update request, through the API service component;

acquiring the updated container security protection profile according to a definition of the updated resource object of the first custom resource, and updating the second custom resource according to the updated container security protection profile, through the access control management component;

controlling the access control agent component of the node device where the container group of the target protection object is deployed, to acquire the updated container security protection profile according to the updated second custom resource, and load the updated container security protection profile into the kernel of the node device to which it belongs.

15. A non-transitory computer-readable storage medium, storing a computer program, which when executed by a computing device, causes the computing device to implement:
provide at least one type of container security protection profile that allow users to select and configure, wherein the at least one type of container security protection profile includes: a container security protection profile based on a container security baseline and/or a container security protection profile for a specified vulnerability in a container environment;
receiving a profile configuration request initiated based on at least one container security protection profile of the at least one type of container security protection profile, through an application programing interface API service component of a container cluster, the profile configuration request including a profile identifier of a target container security protection profile and object information about a target protection object related to the container, the profile configuration request being used to request security protection for the target protection object based on the target container security protection profile;
creating a resource object of a first custom resource corresponding to the target container security protection profile through the API service component; acquiring the target container security protection profile according to a definition of the first custom resource, and creating a second custom resource including the target container security protection profile, through an access control management component of the container cluster;
enabling the target container security protection profile for the target protection object in response to the profile configuration request, to monitor access requests to the target protection object, and perform access control on the access requests based on the target container security protection profile,
the target protection object includes a first workload created in the container cluster before the profile configuration request is received;
the enabling the target container security protection profile for the target protection object in response to the profile configuration request, comprises:
controlling an access control agent component of a node device in the container cluster where the container group of the first workload is deployed, to acquire the target container security protection profile according to the second custom resource, and load the target container security protection profile into a kernel of the node device to which it belongs.

16. The non-transitory computer-readable storage medium of claim 15, wherein, wherein, the enabling the target container security protection profile for the target protection object in response to the profile configuration request, comprises:
enabling the target container security protection profile for the container group of the target protection object or the container of the target protection object or the application of the target protection object, based on the object information of the target protection object.

17. The non-transitory computer-readable storage medium of claim 15, wherein, the computer program, which when executed by a computing device, causes the computing device to further implement:

updating configuration information of the first workload according to the first custom resource through the access control management component;
controlling the access control agent component of the node device where the container group of the first workload is deployed, to update the container group of the first workload according to the updated configuration information of the first workload, through the API service component.

18. The non-transitory computer-readable storage medium of claim 17, wherein, the computer program, which when executed by a computing device, causes the computing device to further implement:
receiving a profile update request for requesting to update the security protection profile of the target container, and updating the resource object of the first custom resource in response to the profile update request, through the API service component;
acquiring the updated container security protection profile according to a definition of the updated resource object of the first custom resource, and updating the second custom resource according to the updated container security protection profile, through the access control management component;
controlling the access control agent component of the node device where the container group of the target protection object is deployed, to acquire the updated container security protection profile according to the updated second custom resource, and load the updated container security protection profile into the kernel of the node device to which it belongs.

19. The non-transitory computer-readable storage medium of claim 15, wherein, the target protection object includes a workload that meets a preset condition;
wherein the computer program, which when executed by a computing device, causes the computing device to further implement, after creating the second custom resource according to the target container security protection profile:
receiving a second workload creation request through the API service component, the second workload creation request carries configuration information of the second workload, and is used to request creation of the second workload according to the configuration information;
if it is determined that the second workload meets the preset condition, updating configuration information of the second workload according to the first custom resource through the access control management component;
deploying a container group of the second workload on at least one node device according to the updated configuration information of the second workload through the API service component.

20. The non-transitory computer-readable storage medium of claim 19, wherein, the computer program, which when executed by a computing device, causes the computing device to further implement:
receiving a profile update request for requesting to update the security protection profile of the target container, and updating the resource object of the first custom resource in response to the profile update request, through the API service component;
acquiring the updated container security protection profile according to a definition of the updated resource object of the first custom resource, and updating the second custom resource according to the updated container security protection profile, through the access control management component;

controlling the access control agent component of the node device where the container group of the target protection object is deployed, to acquire the updated container security protection profile according to the updated second custom resource, and load the updated container security protection profile into the kernel of the node device to which it belongs.

* * * * *